Dec. 21, 1937.  R. E. BRIGGS  2,102,991
SEWAGE DISPOSAL APPARATUS
Filed July 31, 1935   3 Sheets-Sheet 1

INVENTOR:
Robert E. Briggs,
BY
Chas. M. Nissen,
ATTY.

Dec. 21, 1937.   R. E. BRIGGS   2,102,991
SEWAGE DISPOSAL APPARATUS
Filed July 31, 1935   3 Sheets-Sheet 2

INVENTOR:
Robert E. Briggs,
BY
Chas. M. Niesen,
ATT'Y.

Dec. 21, 1937.   R. E. BRIGGS   2,102,991
SEWAGE DISPOSAL APPARATUS
Filed July 31, 1935   3 Sheets-Sheet 3

INVENTOR:
Robert E. Briggs,
BY
Chas. M. Nissen,
ATTY.

Patented Dec. 21, 1937

2,102,991

UNITED STATES PATENT OFFICE 2,102,991

SEWAGE DISPOSAL APPARATUS

Robert E. Briggs, Columbus, Ohio, assignor to The Jeffrey Manufacturing Company, a corporation of Ohio Application July 31, 1935, Serial No. 33,981

10 Claims. (Cl. 210—3)

This invention relates to sewage disposal apparatus, and particularly to a settling tank comprising a part of a sewage disposal system.

An object of the invention is to provide an improved settling tank for a sewage disposal system in which the liquid level may be readily adjusted.

Another object of the invention is to provide an improved adjustable weir, particularly adapted to be used to control the liquid level in a settling tank of a sewage disposal system, though it is capable of general application.

Other objects of the invention will appear hereinafter, the novel features and combinations being set forth in the appended claims.

Figure 1:
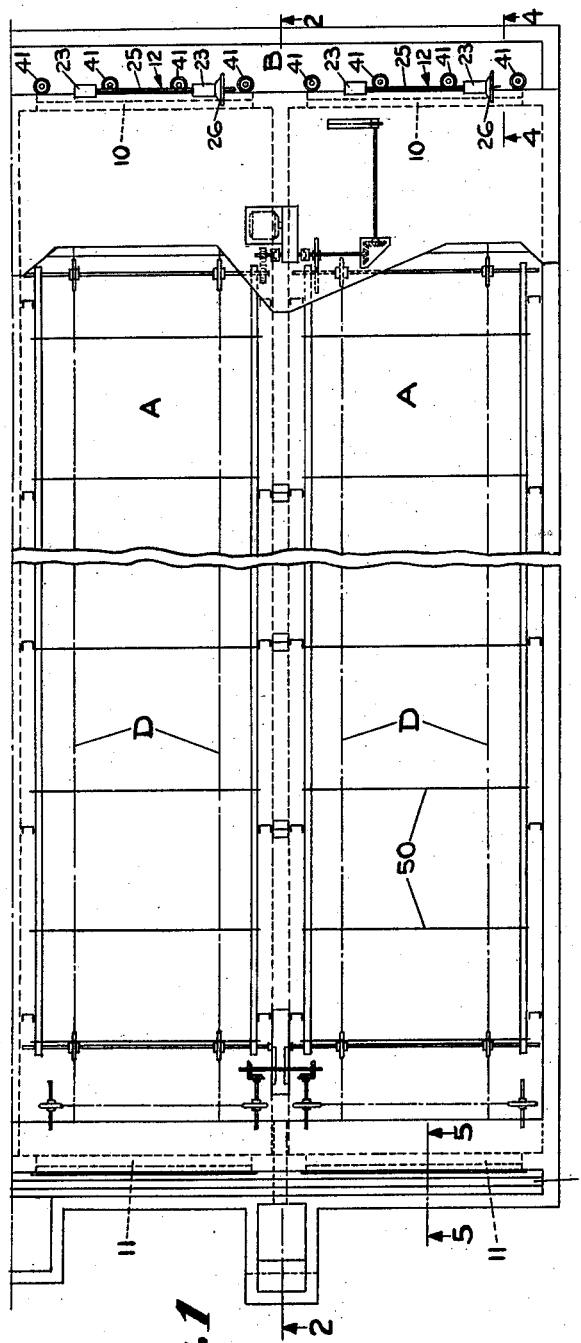
Fig. 1 is a plan view of a pair of settling tanks and associated apparatus of a sewage disposal system comprising my invention.
Figure 2:
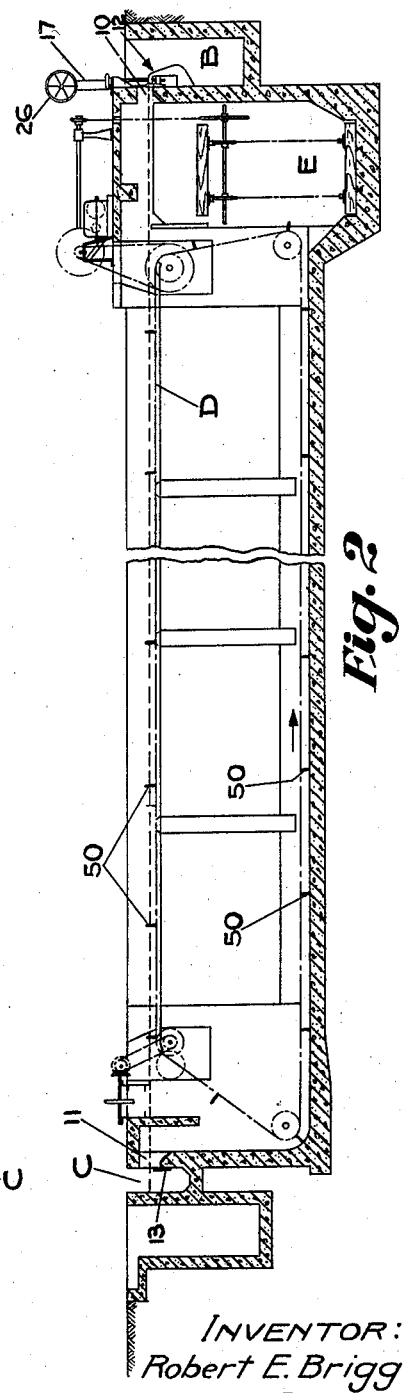
Fig. 2 is a longitudinal sectional view on the line 2—2 of Fig. 1 looking in the direction of the arrows.

Referring to Fig. 1 of the drawings, there is illustrated a pair of sewage disposal settling tanks A which are adapted to receive sewage from an influent channel B and adapted to discharge liquid sewage by way of an effluent channel C after the solid material in said sewage has settled within the tanks A.

Within each of said settling tanks A, there is provided an appropriate scraper conveyor apparatus D comprising spaced cross flights 50 connected to spaced chairs, and operative to convey the solid settled material from the effluent end of said settling tanks A to a sump E adjacent the influent end thereof. Appropriate conveying apparatus is also provided for removing the collected material from the sump E.

The construction of the settling tanks A and the scraper conveyor apparatus D may take the form disclosed and claimed in my application for Conveyors, Serial No. 701,549, filed December 8, 1933.

It will be evident that the settling tanks A receive sewage from the common influent channel B and discharge the liquid sewage to the common effluent channel C. It is highly desirable that the rate of flow of sewage through the settling tanks A be maintained substantially constant to insure proper settling of solids therein. For this reason, a plurality of said tanks A is provided, two being shown in the drawings, though a large number may be employed, if desired.

Adjacent the influent channel B, each of the settling tanks A is provided with an influent duct or opening 10. An effluent duct or opening 11 is provided for each of said settling tanks A adjacent the effluent channel C.

To control the rate of flow of the sewage through each of the settling tanks A, an adjustable weir, designated generally by 12, is provided for each of said influent openings 10. The construction of this adjustable weir is illustrated in detail in Figs. 3 and 4 of the drawings. An adjustable weir is also provided for each of the effluent openings 11, this weir being generally designated by the character 13. The construction thereof is illustrated in detail in Fig. 5 of the drawings.

It will be evident that, by controlling the adjustable weirs 12 and 13 for each of the individual settling tanks A, the rate of flow of the sewage through each individual tank A may be separately controlled. As will be pointed out more in detail hereafter, it is also possible to shut off any one of the tanks A, whereby the number of said tanks in operation at one time may be varied. This provides for a substantially uniform rate of flow of sewage through each of the settling tanks A with any variations of the amount of sewage received in the influent channel B.

Figure 3:
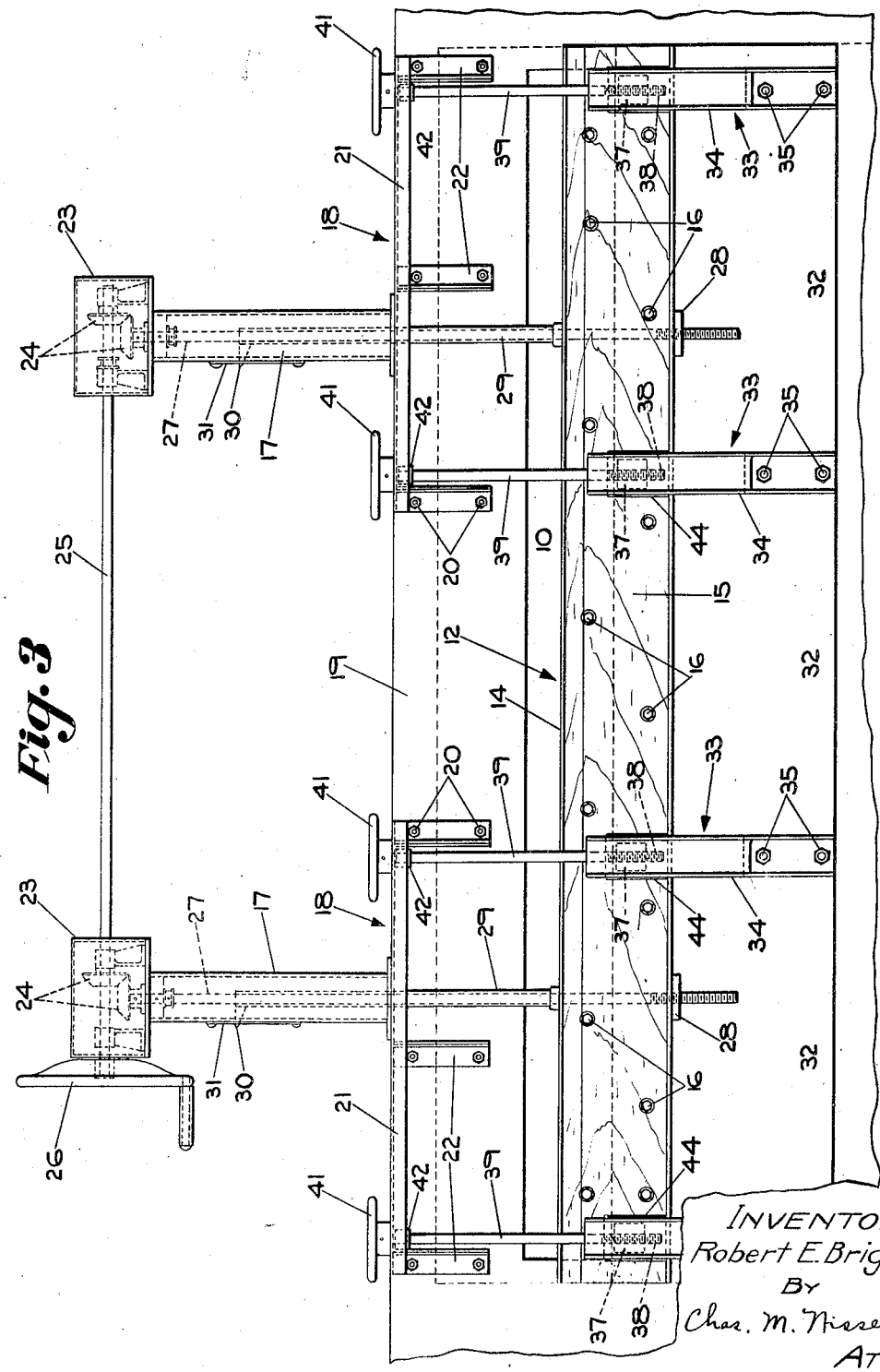
Fig. 3 is an enlarged elevational end view showing the improved weir comprising my invention.
Figures 4, 5:
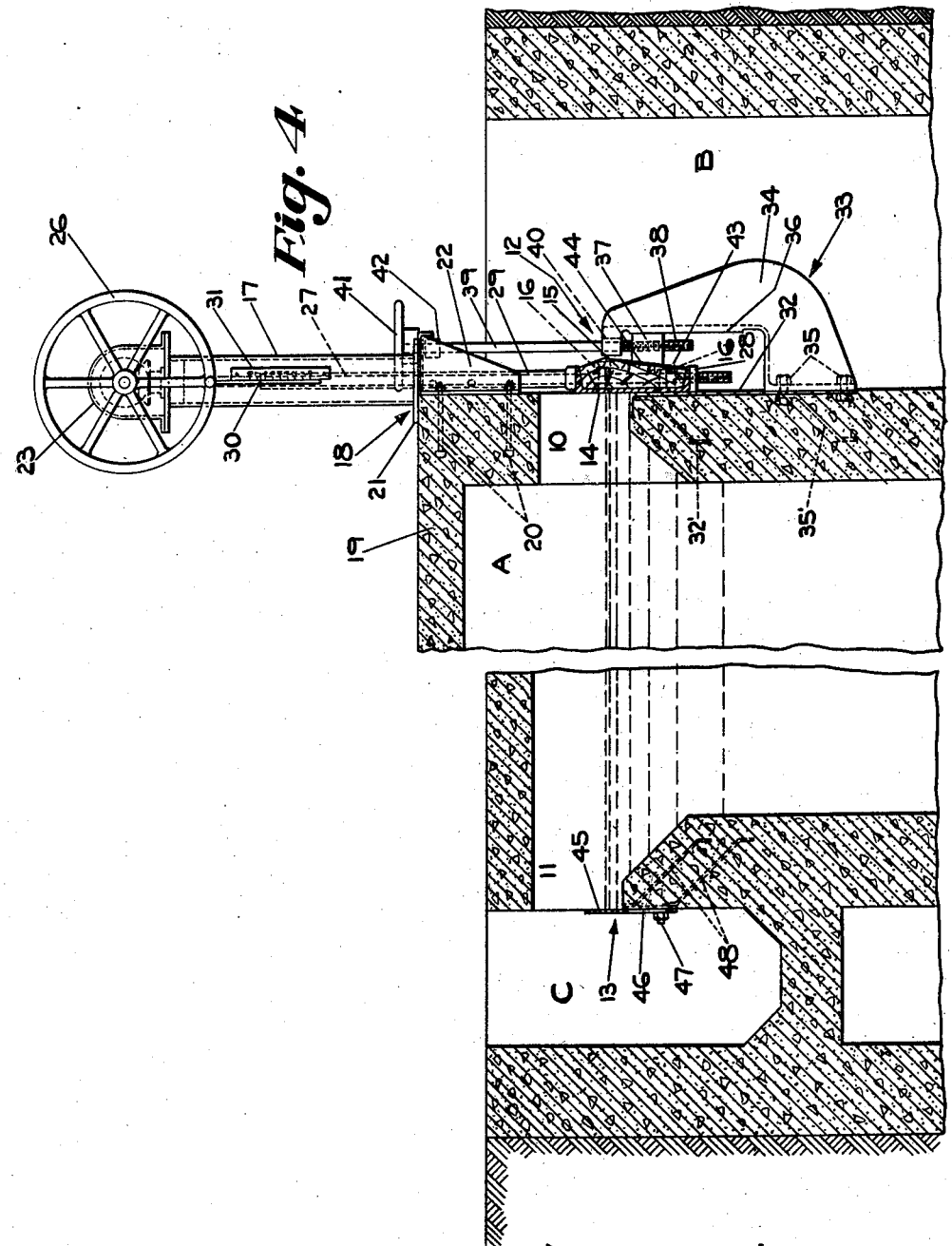
Fig. 4 is an enlarged sectional view of the influent end of the settling tank showing the weir comprising my invention and taken along the line 4—4 of Fig. 1 looking in the direction of the arrows.
Fig. 5 is an enlarged sectional view of the effluent end of the settling tank showing the adjustable weir thereat, the view being taken along the line 5—5 of Fig. 1.

Referring particularly to Figs. 3 and 4 of the drawings, there is illustrated in detail the construction of the adjustable weir 12 which cooperates with the influent opening 10 and which comprises one feature of my invention. As best seen in Fig. 4, the adjustable weir 12 comprises a metal channel member 14 which has a length slightly greater than the length of the opening 10 and a width slightly greater than the width of said opening. Said channel member 14 carries a filler 15 between the side webs thereof which is preferably made of wood, such as cypress. Appropriate counter-sunk bolts 16 are provided for rigidly attaching said filler 15 to said channel member 14.

Means are provided for adjusting the vertical position of said channel member 14 whereby the effective height of the weir 12, and consequently the effective size of the opening 10, may be adjusted. This means comprises a pair of spaced standards 17 carried upon supporting brackets 18, which brackets 18 are in turn supported from a top wall 19 of the settling tank A by appropriate bolts 20.

The supporting brackets 18 are formed by top plates 21 and upright angle plates 22.

Standards 17, 17 carry gear housings 23, 23 adjacent their tops within which are housed appropriate bevel gears 24, 24 which provide a driving connection between horizontal shaft 25, driven by hand wheel 26, and a pair of vertical shafts 27, 27, which are screw-threaded adjacent their bottom portions to threaded blocks 28, 28, which threaded blocks are rigidly attached to the channel member 14, as by welding.

The shafts 27, 27 are extended through pipes 29, 29, which pipes are rigidly attached to the top flange of the channel member 14 and extend upwardly into the standards 17, 17. Said pipes 29, 29 comprise a guide and protecting means for the shafts 27, 27 and also carry at their upper ends pointers 30, 30 which co-operate with scales 31, 31 carried on standards 17, 17 to indicate the distance between the top of said channel 14 and the bottom of the influent opening 10.

It will be evident that by operating the hand wheel 26 the channel member 14 may be adjusted vertically to control the effective height of the weir 12 and the effective size of the influent opening 10. Furthermore, the width of the channel member 14 is greater than the width of the opening 10 whereby said opening may be completely closed to prevent any flow of sewage from the influent channel B into a particular settling tank A. A wear plate 32 is preferably provided on the outer surface of the settling tank A adjacent the opening 10, whereby a wearing surface will be provided for the channel member 14 and whereby a close water-tight fit between said channel member 14 and the tank A is provided. An embedded plate 32' may be provided to attach the plate 32 rigidly to the tank A.

In order to provide the above mentioned water-tight connection between the tank A and the weir 12 or, more specifically, between the channel member 14 and the wearing plate 32, means are provided for clamping said channel member 14 tightly against said wear plate 32. This means comprises a plurality of spaced brackets 33 having reinforcing side plates 34, which brackets 33 are rigidly attached to the wall of the tank A, as by appropriate tie bolts 35 and a co-operating embedded plate 35'. Each of said brackets 33 is provided with a sliding wearing and guiding surface 36 along which is adapted to be slid vertically a clamping or wedging block 37, preferably made of bronze, which is screw-threaded to receive the screw-threaded end 38 of a vertical shaft 39. Said shaft 39 extends through an opening 40 in the upper end of the bracket 33 which forms an appropriate guide therefor. The upper end of each of the shafts 39 is carried in an appropriate journal in the top plate 21 of a supporting bracket 18 and is provided with an operating hand wheel 41. A collar 42 is also provided adjacent the upper portion of each of the shafts 39 to restrict the upward movement thereof.

It will be evident that upon turning the hand wheel 41 in one direction, such as a counter-clockwise direction, the clamping block 37 will be forced downwardly to release any clamping of the channel member 14 with wear plate 32. Upon the turning of the hand wheel 41 in the opposite direction, a very effective clamping action will be effected between said channel member 14 and the wear plate 32. If the upper end of the channel member 14 is at such a height as to close the opening 10 completely, the upper end of said channel member 14 will also be clamped against the wall of the tank A. The above mentioned clamping action will be effective for the following reasons:

The filler 15 is tapered downwardly to provide tapering surface 43, as illustrated in Fig. 4. Clamping block 37 carries a co-operating tapering surface. It is thus evident that upward movement of block 37 relative to filler 17 will effect a wedging and clamping action.

It is preferred that wear strips 44 be provided on the tapering surface between the filler 15 and the clamping blocks 37 to prevent undue wear of the filler. These wear strips 44 may be attached to the filler 15 in any desired manner, as by counter-sunk wood screws.

As best seen in Fig. 5 of the drawings, the weir 13 adjacent the effluent opening 11 is of rather simple construction. This weir 13 comprises an adjustable plate 45 extending longitudinally of said opening 11, which plate 45 is provided with a plurality of elongated slots 46 whereby the height of said plate 45 may be adjusted by means of co-operating studs and nuts 47, which studs are carried by appropriate embedded plates 48. It will be evident that, by loosening the nuts on the studs, the plate 45 may be raised or lowered within the limits provided by the elongated slots 46. By adjusting this weir 13 in co-operation with the adjustment of the weir 12, the liquid level in the settling tank A may be adjusted to any desired height. In operation, the adjustable weir C is usually adjusted to a desired position after initial tests, after which it is left in this adjusted position and the control of the flow of sewage to any one tank A is thereafter controlled by the adjustable weir 12.

To review briefly the operation of the system and the adjustable weirs comprising my invention, the sewage will be received by influent channel B. Adjustable weirs 12 may then be adjusted to control the amount of sewage which flows in each of the settling tanks A and it is possible to adjust the weirs 12 so that one or more of said settling tanks A will receive no sewage at all. To adjust the weir 12, the clamping blocks 37 will be effectively released by turning the hand wheels 41 in a counter-clockwise direction. The operation of hand wheel 26 will then raise or lower the weir to a desired position. Thereafter hand wheels 41 will be operated in a clockwise direction to clamp the weir 12 rigidly in place. Liquid will then flow into the individual settling tanks A at a desired rate wherein solid particles will settle out and be conveyed by scraper conveyor apparatus D to a sump E. The collected material in said sump E will then be conveyed therefrom by appropriate conveying apparatus. The fluid portion of the sewage in tanks A will then flow out over the adjustable weir 13 through the effluent opening 11 into the effluent channel C, from whence it will be directed to any desired place.

It is obvious that by providing the two adjustable weirs 12 and 13, the former of which is readily adjustable at any time, very complete control of the flow of sewage to any one settling tank A is provided. The particular construction of the adjustable weir 12 also provides for a water-tight weir whereby any one of the settling tanks A may be effectively taken out of operation without effecting the operativeness of any of the other settling tanks A. This, of course, provides for the repairing of any of the conveying mechanism in any of the settling tanks A without disabling the entire system or provides for a wide variation in the operation of said settling tanks A which are in actual operation at one time.

It should be particularly noted that the plate 32 constitutes a seat for the weir 12, as shown in Fig. 4. The lifting and lowering mechanism shown in Fig. 3 may be operated by a single wheel 26. Since the suspension rods 27, 27 are connected to the weir 12 at spaced-apart points the weir 12 is retained in horizontal position at its various elevations. The vertical guideways 36 are distributed along the weir, as shown in Fig. 3, one adjacent each end of the weir and two in spaced-apart positions intermediate the ends of the weir. The wedges 37 are operable independently of each other and each is adapted to slide along its vertical guideway 36, and along the plate 44 which is preferably of metal to reduce friction and prevent the wedge 37 from being indented into the wooden filler 15. It can readily be seen, by referring to Fig. 3, that rotation of the wheels 41 operates the wedging blocks 37 either upwardly or downwardly so that whenever desired the weir 12 may be clamped to its seat or disengaged therefrom sufficiently to permit rotation of the wheel 26 to vary the elevations of the weir.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. In a settling tank, the combination with a duct, of a weir for controlling the effective size of said duct, said weir comprising a member adapted to move over said duct, means comprising a pair of spaced vertical shafts for raising and lowering said member, means for operating said shafts in unison, and means for clamping said member in an adjusted position, said last mentioned means comprising a plurality of spaced vertical shafts and clamping blocks operated thereby adapted to effect a wedging action on said member.

2. In a settling tank, the combination with a duct, of a weir for controlling the effective size of said duct, said weir comprising a member adapted to move over said duct, means for raising and lowering said member, and means for clamping said member in an adjusted position, said last mentioned means comprising a plurality of spaced vertical shafts and clamping blocks operated thereby adapted to effect a wedging action on said member.

3. An adjustable weir comprising a tank wall provided with an external wear plate, a channel member adapted to be raised and lowered with respect to said wear plate and to slide thereover, a filler made of wood positioned between the side flanges of said channel member, said filler having a tapering surface, and means co-operating with the tapering surface of said filler to clamp said channel member in a fluid-tight relation with said wear plate.

4. An adjustable weir comprising a tank wall provided with an external wear plate, a channel member adapted to be raised and lowered with respect to said wear plate and to slide thereover, a filler positioned between the side flanges of said channel member, said filler having a tapering surface, and means co-operating with the tapering surface of said filler to clamp said channel member in a fluid-tight relation with said wear plate and comprising a pair of spaced wedges having upright operating shafts.

5. An adjustable weir comprising a tank wall provided with an external wear plate, a channel member adapted to be raised and lowered with respect to said wear plate and to slide thereover, a filler made of wood positioned between the side flanges of said channel member, and means co-operating with said filler to clamp said channel member in a fluid-tight relation with said wear plate.

6. An adjustable weir comprising a tank wall provided with an external wear plate, a channel member adapted to be raised and lowered with respect to said wear plate and to slide thereover, a filler positioned between the side flanges of said channel member, and means co-operating with said filler to clamp said channel member in a fluid-tight relation with said wear plate.

7. In a settling tank, the combination with a weir, of a member adjustable vertically with respect thereto to vary the effective height thereof, supporting brackets above said weir carried by said tank, standards on said brackets, shafts extending through said standards and connected to said member, means comprising a single operating handle for operating said shafts to adjust the position of said member, and clamping means for said member comprising a plurality of brackets attached to said tank at a position below said weir, clamping blocks positioned between said last mentioned brackets and said member, shafts extending upwardly from said clamping blocks to said first mentioned brackets, and operating means for said shafts, said clamping means being constructed and arranged to clamp said member in any adjusted position upon the operation of said operating means by being brought into contact with said member when adjusted.

8. In a settling tank, the combination with a weir, of a member adjustable vertically with respect thereto to vary the effective height thereof, supporting brackets above said weir carried by said tank, standards on said brackets, shafts extending through said standards and connected to said member, means for operating said shafts to adjust the position of said member, and clamping means for said member comprising a plurality of brackets attached to said tank at a position below said weir, tapered clamping blocks positioned between said last mentioned brackets and said member, shafts extending upwardly from said clamping blocks to said first mentioned brackets, and operating means for said shafts, said clamping means being operative to clamp said member in any adjusted position upon the operation of said operating means by being brought into contact with said member when adjusted.

9. An adjustable weir comprising an elongated member over the upper edge of which liquid is adapted to flow, means connected to said elongated member to vary the elevation thereof and thereby adjust the elevation of said upper edge, an elongated seat for said elongated member, spaced-apart abutments each having a vertical guideway, wedging devices between said guideways and the adjacent face of said elongated member, and spaced-apart wedge operating means connected to operate said wedging devices and distributed along said member to operate said wedging devices to contact said member and to secure it to its seat.

10. An adjustable weir comprising a wall, a channel member adapted to be raised and lowered with respect to said wall and to slide over said wall, a wood filler positioned between the side flanges of said channel member and having a tapered surface, means comprising a clamping block having a tapered surface co-operating with said first mentioned tapered surface to clamp said channel member, and a wear plate between said wood filler and said clamping block to prevent wearing of said wood filler.

ROBERT E. BRIGGS.